Nov. 3, 1964   G. C. HARRISON ETAL   3,154,816
CLOSED MOLDS FOR CASTING GASKETS ON PIPE ENDS
Filed June 8, 1959
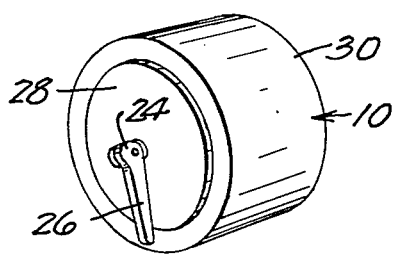
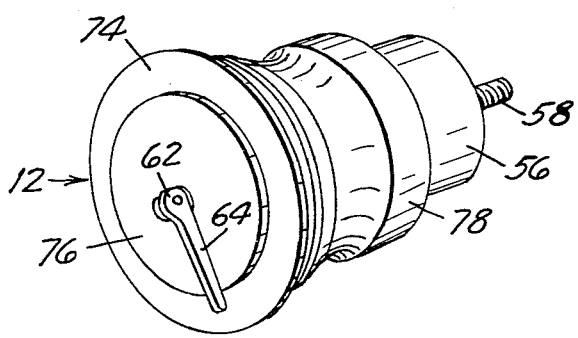
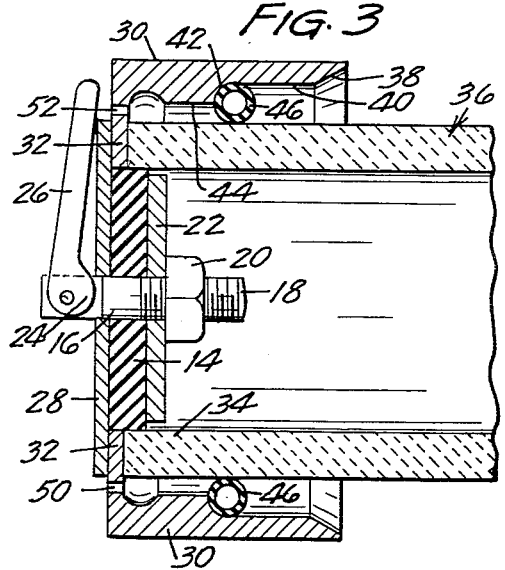
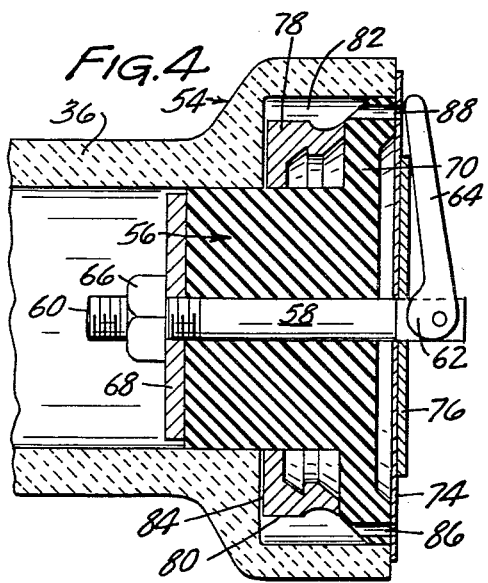
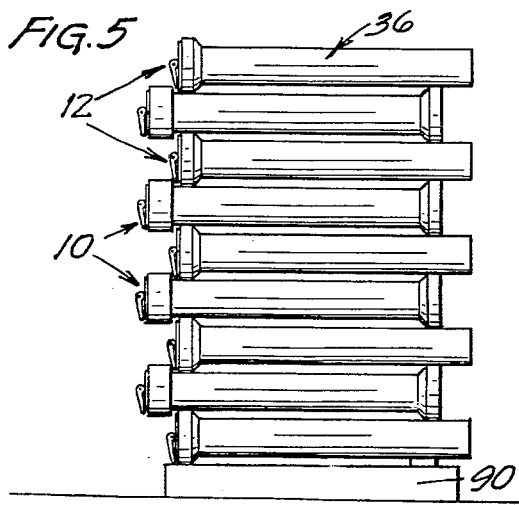
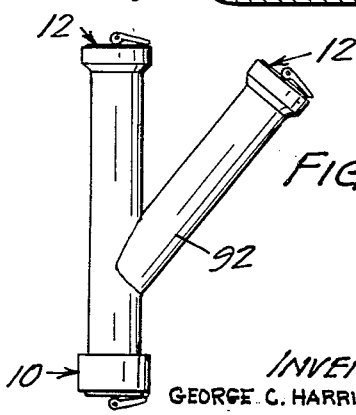
INVENTORS
GEORGE C. HARRISON
CARL F. GAETKE
BY
Carpenter, Abbott, Coulter & Kinney
ATTORNEYS

United States Patent Office 3,154,816
Patented Nov. 3, 1964

3,154,816
CLOSED MOLDS FOR CASTING GASKETS ON PIPE ENDS
George C. Harrison, Roseville, and Carl F. Gaetke, St. Paul, Minn., assignors to Minnesota Mining and Manufacturing Company, St. Paul, Minn., a corporation of Delaware
Filed June 8, 1959, Ser. No. 818,643
1 Claim. (Cl. 18—30)

The present invention relates to the formation of sealing gaskets in situ on pipe ends. Particularly the invention relates to closed molds for mounting on bell and spigot end or plain end pipe sections for the in situ casting of sealing gaskets thereon.

In the past the in situ casting of gaskets on pipe ends, particularly on the bell and spigot ends of vitrified clay pipe sections or lengths and fittings used in the construction of sewage lines, telephone and electrical conduits, and the like, has been accomplished by the use of open molds.

While open molding procedures were adequate for the casting of gaskets from slow, heat curing resins such as the plasticized polyvinyl chloride resins, the advent of rapid, ambient temperature curing, bacterially inert gasket forming casting resins such as those disclosed in copending application Serial No. 795,987, Harrison and Axdahl, filed February 27, 1959, now abandoned, has brought in its wake the desire for faster, more economical ways of casting sealing gaskets on pipe ends. Elimination of the requirements for long cure cycles and high temperature curing operations by rapid ambient temperature curing resins, such as those of the Harrison and Axdahl application, supra, which are included herein by reference, pointed up the time consuming and wasteful handling gasket forming and trimming operations involved in the in situ casting of gaskets with open molds.

Open molds require vertical positioning of the pipe sections on which the sealing gaskets are to be cast; consequently it is not possible to form gaskets on the pipe ends when the pipe sections are in their normally horizontally disposed stacked relation on pallets. Further, open mold techniques are not readily adaptable to the in situ casting of gaskets on fittings such as Y's, T's and elbows, which fittings may constitute as much as one-fifth of the total footage of vitrified clay pipe produced.

Accordingly it is an object of this invention to provide closed molds which greatly facilitate and accelerate the in situ casting of sealing gaskets on pipe ends, and which, being locked in place on the pipe ends, are as adaptable to the formation of gaskets on the ends of fittings as they are to such formation on straight pipe lengths, and which closed molds may be utilized without disturbing normal stacking arrangement or positioning of the pipe sections.

It is another object to provide closed molds which eliminate any necessity for trimming operations and the attendant resin wastage of the formed gaskets; and ancillary to this object, it is a further object to provide closed molds which eliminate "run under" problems wherein the gasket forming material escapes from the confining mold.

A closed mold assembly made in accordance with this invention comprises expansible means for insertion into the end of a pipe section, means for expanding said expansible means into frictional engagement with the cylindrical pipe wall within the end of the pipe section and for releasing said expansible means from such engagement, gasket forming means associated with said expansible means for forming a closed annular space concentric with the outer or inner cylindrical pipe wall surface on which the gasket is to be cast, said expansible means maintaining said gasket forming means positioned and centered when in its expanded position.

While closed molds of this invention, for both bell and spigot end mounting, are most advantageously utilized in the in situ casting of sealing gaskets from rapid ambient temperature curing resins which require no heat in their curing, their use is not limited thereto. The closed molds of this invention, by permitting the direct injection into a sealed space of the gasket forming material, permit the use of higher viscosity resins by enabling their application under pressure to the mold space to speed up curing times, and may thus be used advantageously even with heat curing resins.

Other and further objects and advantages of the closed molds of this invention will become apparent as the description proceeds with reference to the embodiments thereof illustrated in the accompanying drawings, wherein FIGURE 1 is a perspective view of a closed mold for the spigot or plain end of a pipe section; FIGURE 2 is a perspective view of a closed mold for the bell or socket end of a pipe section; FIGURE 3 is a cross-sectional view of the closed mold of FIGURE 1 mounted on the end of a pipe section; FIGURE 4 is a cross-sectional view of the closed mold of FIGURE 2 mounted on the bell end of a pipe section; FIGURE 5 is a quasi-schematic representation of the application of the closed molds of this invention to nestingly stacked pipe sections on a pallet; and FIGURE 6 is a quasi-schematic illustration of the utilization of these closed molds in the formation of gaskets on fittings.

Referring now to the accompanying drawings in detail, like reference characters will be used throughout to designate like parts.

Referring first to FIGURES 1 and 2, there are shown respectively by the numerals 10 and 12 suitable closed molds made in accordance with the principles of this invention for the application to the spigot and bell ends of a pipe length or section. While these embodiments are chosen for illustrative purposes, as will be apparent as the description proceeds, these structures are capable of considerable modification without departing from the spirit of the invention.

Referring now specifically to FIGURE 3, there is shown therein an expansible cylindrical body 14 of a resilient rubbery material with good recovery, such as natural rubber, neoprene or other synthetic rubbery polymer or its equivalent. This body 14 is carried slidably on an axial stud 16. The inner end of the stud 16 is threaded, as at 18, and an adjusting nut 20 is provided thereon. Interposed between the adjusting nut 20 and the inner end of the expansible body 14 is a compression member in the form of a plate 22, which plate is slidably disposed on the stud 16. Pivotally mounted at the outer end of the stud 16 is a cam 24 having an operating lever 26 extended therefrom. Interposed between the cam 24 and the rubber body 14 and slidably disposed on stud 16 is a facing plate or second compression member 28, of somewhat greater diameter than the rubber body. Loosely and slidably surrounding the rubber body and adapted to abut against the facing plate 28 is an annular gasket forming member 30.

The gasket forming member 30 is in the shape of an annular sleeve or collar having an inturned flange 32 at its outer end. This collar is adapted to surround in concentrically spaced relation the plain or spigot end 34 of a pipe section 36. The inturned flange 32 abuts against the spigot end 34 of the pipe so that the open end of the collar opens along the length of the pipe.

The open end of the annular sleeve 30 is beveled as at 38 to facilitate entrance thereinto of a sealing member and thereafter forms a smooth cylindrical inner surface 40, which merges with a shoulder 42 intermediate the sleeve ends, which shoulder 42 in turn merges into an inwardly stepped inside molding surface 44 of the collar, which surface determines the general form of the gasket to be cast on the pipe end.

An O-ring or similar sealing member 46 slides over the pipe end and is carried on the inner surface 40 of the collar abutting against the shoulder 42 when the mold is seated on the pipe end, thereby completing a closed mold space 48 between the molding surface 44 and the outer cylindrical wall of the spigot end 34 of the pipe section. Those portions of the mold forming the closed mold cavity are treated with a suitable mold release to facilitate removal of the mold after the gasket has cured.

The closed mold 10 is locked into position on the spigot end 34 of the pipe, and the gasket forming sleeve 30 is maintained concentrically centered in position by drawing the compression plates 22 and 28 toward one another on swinging movement of the cam lever 26 to move the cam 24 from its release position to its over-center, locking and camming position illustrated. Upon drawing these plates 22 and 28 toward one another by movement of the cam against the facing plate 28, the rubbery body 14 expands within the inside of the spigot end 34 of the pipe section to simultaneously lock the closed mold in position and press the sealing member 46 into its sealing position.

Since the pipe sections of the nature with which major use of these closed molds 10 and 12 is contemplated are of kiln fired vitrified clay, their dimensions are not usually the same from pipe length to pipe length, and quite wide dimensional variances are common. Therefore, the expansible body 14 is generally made to be initially considerably smaller than the inside diameter of the pipe section over which it is to be fitted. Further, the initial diameter of the expansible body may be, of course, controlled by means of the adjusting nut 20 prior to the application of compression stresses on the cam 24.

In the use of this closed mold 10, fill and vent openings 50 and 52 respectively are provided in the inturned flange 32 for access into the closed mold space 48. The gasket forming resin may be injected directly and under pressure through fill opening 50, the injected material displacing the air or other atmosphere that may be in the closed mold space and forcing it out through the vent opening 52. By placing the fill and vent openings 50 and 52 diametrically opposite one another it is generally very easy to tell when the mold cavity is filled; however, this may also be done by injecting predetermined weighed amounts of resin in each cavity. In either instance uniform gaskets requiring no subsequent edge trimming result in all pipe sections on which the molds are used. After the gasket has been formed within the mold space 48, the cam 24 is released from its compression position and the closed mold removed from the end of the pipe. Since the gasket forming resins used themselves form resilient gaskets, removal of the O-ring 46 over any predetermined shape of gasket is not generally a problem. Usually the O-ring 46 will remain in place as the closed mold 10 is removed and it may be simply pulled off over the gasket thereafter. However, if desired, an inflatable sealing member may be used in place of the simple O-ring illustrated.

In FIGURE 4 the adaptation of the invention to the formation of the closed end mold 12 to cast a sealing gasket in the bell end 54 of a pipe section 36 is illustrated in detail. In this embodiment a solid, generally cylindrical expansible rubbery body 56 is slidably mounted on an axial stud 58. Stud 58 is threaded on its inner end as at 60, and has pivotally mounted on the outer end thereof a cam 62 having an operating lever 64. In this embodiment, as in the previously described embodiment with respect to the spigot end mounted closed mold, an adjusting nut 66 is threaded onto the threaded inner end of the stud 58 and a compression plate 68 is disposed between the inner end of the rubbery body 56 and the adjusting nut. As can be seen from the figure of the drawing, the inner end portion of the rubber body is disposed within the pipe length 36 adjacent the bell end 54, whereas the outer end portion of the rubbery body 56 is flanged outwardly to form an outturned flange 70, the periphery of which is adapted to expand and engage the inner surface of the bell 54 of the pipe section 36 adjacent the end of the section.

The central portion of the outer end of the expansible body 56 is recessed as at 72 to facilitate peripheral expansion of the flange 70 into sealing engagement with the inside surface of the bell 54 of the pipe section.

The facing plate 74 covers the outer surface of the expansible body 56 and abuts the bell end 54 of the pipe to limit the penetration of the mold 12 into the bell. Due to the recess 72 it is advisable, although not necessary, to provide a reinforcing plate such as that shown at 76 on the facing plate against which the cam 62 may act.

Carried on the periphery of the expansible body 56, adjacent to the flanged outer end 70 thereof, is an annular member in the form of ring 78, the outer surface 80 of which forms a portion of the mold surface for the sealing gasket to be provided on the bell. In order to complete the closed mold cavity in which the sealing gasket is to be formed, the inner surface of the flange 70 of the rubbery body is beveled outwardly or otherwise shaped from its juncture with the outer mold surface 80 of the annular ring 78 to its abutment with the inside surface of the valve 54 to correspond with the shape of the seal.

In the embodiment shown in FIGURE 4 it will be noted that the annular ring is spaced concentrically from the inside surface of the bell end to provide a closed mold space 82 as well as axially from the bell shoulder as at 84. The axial spacing has been found to be highly desirable to provide a resin formed bell shoulder surfacing to offset dimensional differences which often occur between interfitting bell and spigot ends and assure a seal at the joint therebetween in joining pipe lengths or sections to one another.

The operation of the closed end mold 12 is generally the same as the operation of the closed end mold 10 previously described in that cam lever 64 is moved so that the cam 62 exerts pressure against the plate 76 and squeezes the expansible body 56. Both the flanged portion 70 and the inner end portion of the expansible body 56 expand and seal in place, the expansion also serving to maintain the concentric positioning of the annular ring 78 for formation of the bell sealing gasket therein. Once the mold is positioned, the gasket forming resin can be pressurely injected into the closed mold space through a suitable filling opening 86 and the air, as well as any gases generated during curing of the gasket, expelled through the vent opening 88 diametrically opposite thereto, these openings being provided through the peripheral portion of the flange 70 and the facing plate 74.

In the ordinary production of bell and spigot end vitrified clay pipe, the sections are stacked as they are removed from the kiln in horizontal layers with the bell and spigot ends of each layer alternating as illustrated in FIGURE 5. Customarily these pipe sections are stacked on pallets in alternating horizontal rows of six and four, there being five horizontal rows of six pipe lengths and four horizontal rows interposed therebetween of four pipe lengths; it is this arrangement which is shown in FIGURE 5. The closed end molds 10 and 12 can be mounted on the pipe ends as shown on the semi-schematic illustration without disturbing the relation of the pipe sections to one another on the pallet 90.

In FIGURE 6 the application of a closed end mold to a Y-fitting 92 is illustrated, and here again it is seen that through the utilization of these closed molds the vertical or horizontal positioning of the fitting ends is immaterial to the gasket formation.

As will be apparent from the foregoing description, readily mountable and demountable closed mold assemblies are provided both for plain or spigot ends and bell ends of pipe lengths and fittings. Numerous modifications of the specific structures illustrated will, of course, suggest themselves to those skilled in the art, and it is to be understood that the compass of the invention is not limited to the precise embodiments specifically illustrated and described. Thus, for example, in place of a rubbery expansible body as in the illustrated embodiments, the expansible means could be provided by a vacuum contractible body which expands upon release of the vacuum. Also, the expansible means could constitute a mechanically expansible assembly, carried by the mold structure, or an inflatable bladder or the like. The scope of the invention is such as to encompass all suitable modifications which fall within the scope of the appended claim.

We claim:

A closed mold mountable in the bell end of a pipe section for casting a sealing gasket in situ therein which bell end has inside and outside surfaces, said mold comprising axially spaced outer and inner end portions, the inner end portion being of smaller diameter than the outer end portion, for insertion into the main length of pipe section beyond the bell end thereof, said outer end portion being of enlarged diameter for engagement with the inside surface of the bell end of said pipe section adjacent the end thereof, an annular member disposed between said outer and inner end portions in concentric spaced relation to the inside wall surface of said bell providing a gasket forming cavity between said inner and outer end portions, said inner and outer end portions including radially expansible peripheries for frictionally engaging the inside wall surfaces of the main pipe length and the bell respectively, said outer end portion having access and vent openings therethrough communicating with the space formed between said annular member and the inside wall surface of said bell for the intrusion of gasket forming casting resin thereinto and the expulsion of gases therefrom.

References Cited in the file of this patent

UNITED STATES PATENTS

| | | |
|---|---|---|
| 806,783 | Dayton | Dec. 12, 1905 |
| 1,038,396 | Langford | Sept. 10, 1912 |
| 1,715,942 | Morgan | June 4, 1929 |
| 1,974,878 | Scribner | Sept. 25, 1934 |
| 2,284,741 | Johnston | June 2, 1942 |
| 2,756,479 | Garneau | July 31, 1956 |
| 2,779,996 | Tanis | Feb. 5, 1957 |
| 2,892,235 | Peterson | June 30, 1959 |

FOREIGN PATENTS

| | | |
|---|---|---|
| 16,872 | Australia | Jan. 21, 1935 |